(12) United States Patent
Yukumatsu

(10) Patent No.: US 9,797,991 B2
(45) Date of Patent: Oct. 24, 2017

(54) FMCW RADAR DEVICE

(71) Applicant: DENSO CORPORATION, Kariya, Aichi-pref. (JP)

(72) Inventor: Masanobu Yukumatsu, Kariya (JP)

(73) Assignee: DENSO CORPORATION, Kariya, Aichi (JP)

( * ) Notice: Subject to any disclaimer, the term of this patent is extended or adjusted under 35 U.S.C. 154(b) by 334 days.

(21) Appl. No.: 14/648,522

(22) PCT Filed: Nov. 12, 2013

(86) PCT No.: PCT/JP2013/080560
§ 371 (c)(1),
(2) Date: May 29, 2015

(87) PCT Pub. No.: WO2014/084038
PCT Pub. Date: Jun. 5, 2014

(65) Prior Publication Data
US 2015/0338506 A1    Nov. 26, 2015

(30) Foreign Application Priority Data

Nov. 30, 2012  (JP) ................. 2012-262381

(51) Int. Cl.
*G01S 7/35* (2006.01)
*G01S 13/04* (2006.01)
(Continued)

(52) U.S. Cl.
CPC ..... *G01S 7/35* (2013.01); *G01S 7/40* (2013.01); *G01S 7/415* (2013.01); *G01S 13/04* (2013.01);
(Continued)

(58) Field of Classification Search
CPC ..... G01S 7/35; G01S 7/40; G01S 7/415; G01S 13/04; G01S 13/34; G01S 13/583; G01S 13/93; G01S 13/345
(Continued)

(56) References Cited

U.S. PATENT DOCUMENTS 5,619,208 A    4/1997  Tamatsu et al.
6,320,531 B1  11/2001  Tamatsu
(Continued)

FOREIGN PATENT DOCUMENTS

JP   H07151852 A    6/1995
JP   H08262130 A   10/1996
(Continued)

OTHER PUBLICATIONS

International Search Report (in Japanese with English Translation) for PCT/JP2013/080560, mailed Dec. 24, 2013; ISA/JP.
(Continued)

*Primary Examiner* — Frank J McGue
(74) *Attorney, Agent, or Firm* — Harness, Dickey & Pierce, P.L.C.

(57) ABSTRACT

In a FMCW radar device, a transmission unit transmits a transmission signal that has a rising portion in which the frequency successively increases and a falling portion in which the frequency successively decreases. A reception unit receives a reception signal resulting from the transmission signal being reflected by a target and outputs a beat signal based on the transmission signal and the reception signal. A control unit determines whether or not three or more targets that have the same relative speed are present at the same orientation among a plurality of targets extracted from a plurality of peak frequencies in each of the rising portion and the falling portion of the beat signal, and when determined that three or more targets are present, gives
(Continued)

notification that oscillation has occurred in a power supply bias circuit that supplies power supply voltage to the transmission unit or the reception unit.

11 Claims, 5 Drawing Sheets

(51) Int. Cl.
  *G01S 7/41* (2006.01)
  *G01S 7/40* (2006.01)
  *G01S 13/34* (2006.01)
  *G01S 13/58* (2006.01)
  *G01S 13/93* (2006.01)

(52) U.S. Cl.
  CPC ............ *G01S 13/34* (2013.01); *G01S 13/583* (2013.01); *G01S 13/93* (2013.01); *G01S 13/345* (2013.01)

(58) Field of Classification Search
  USPC .......................................................... 342/70
  See application file for complete search history.

(56) References Cited

U.S. PATENT DOCUMENTS

| | | | |
|---|---|---|---|
| 8,065,084 B2* | 11/2011 | Urban | B60W 40/02 340/435 |
| 2003/0174054 A1 | 9/2003 | Shimomura | |
| 2005/0116854 A1* | 6/2005 | Beez | G01S 7/4026 342/70 |
| 2008/0158046 A1 | 7/2008 | Kai | |
| 2014/0159946 A1* | 6/2014 | Asanuma | G01S 13/931 342/175 |

FOREIGN PATENT DOCUMENTS

| | | |
|---|---|---|
| JP | 2001166042 A | 6/2001 |
| JP | 2003270348 A | 9/2003 |
| JP | 2008107281 A | 5/2008 |
| JP | 2008209225 A | 9/2008 |
| JP | 2009222472 A | 10/2009 |

OTHER PUBLICATIONS

International Preliminary Report on Patentability for PCT/JP2013/080560, mailed Jun. 11, 2015 (in Japanese with English translation).

* cited by examiner

FMCW RADAR DEVICE

CROSS REFERENCE TO RELATED APPLICATIONS

This application is a U.S. National Phase Application under 35 U.S.C. 371 of International Application No. PCT/JP2013/080560 filed on Nov. 12, 2013 and published in Japanese as WO 2014/084038 A1 on Jun. 5, 2014. This application is based on and claims the benefit of priority from Japanese Application No. 2012-262381 filed on Nov. 30, 2012. The entire disclosures of all of the above applications are incorporated herein by reference.

BACKGROUND

Technical Field

The present invention relates to a frequency-modulated continuous-wave (FMCW) radar apparatus. In particular, the present invention relates to an FMCW radar device that transmits an electromagnetic wave of which the frequency linearly increases and decreases, receives a returned electromagnetic wave of the transmitted wave that has been reflected by a target, and obtains relative distance and the like of the target from a beat signal based on the received wave and the transmitted wave.

Background Art

In general, in the FMCW radar device, an electromagnetic wave, such a wave in the millimeter-wave region, is transmitted such that the frequency thereof linearly increases and decreases in relation to time, and a returned electromagnetic wave that has been reflected by a target ahead is received. The received wave is mixed with the transmitted wave, and as a result, a signal (beat signal) that has a frequency (beat frequency) proportional to the relative distance of the target is extracted. Fast-Fourier transform (FFT) analysis is performed on the extracted beat signal, the frequency is extracted by peak detection, and the relative distance and the like of the target is calculated from the frequency.

In relation to the foregoing, PTL 1 describes a technique for removing noise (noise components having little fluctuation in frequency and level over time) that is steadily applied to the beat signal in the FMCW radar device.

In this technique, spectral distribution data that has a spectral level that is substantially equal to or greater than a predicted level of a steady regular noise component is stored and held in a memory as initial data. Then, spectral distribution data of a beat signal obtained during transmission and reception of a radio wave is compared with the data in the memory at each unit frequency interval. Of the compared data, the lower spectrum level is set as the spectral level of the steady noise component at the frequency, and the data in the memory is updated thereby. The updated noise data is subtracted from the spectral distribution data of the beat signal, and the noise component is removed. The relative distance of an object is determined from the spectral distribution data of the beat signal from which the noise component has been removed.

PTL 1 JP-A-H07-151852

The above-described method described in PTL 1 is that in which a steadily applied noise component in a beat signal is removed. However, in some cases, the beat signal includes noise that dynamically changes depending on the behavior of a target, unlike the noise component that has little fluctuation in frequency and level over time. In this regard, the circuits of the FMCW radar device are divided into a transmission system (DAC, VCO, amplifier, transmission antenna, and the like), a reception system (reception antenna, mixer, and the like), and a baseband system (amplifier and AD converter), and considered separately. In this case, noise that is generated in the transmission system or the reception system as a result of oscillation in a power supply bias circuit of the FMCW radar device results in the beat signal including noise that dynamically changes depending on the behavior of the target. Such noise generation cannot be detected by the method described in PTL 1.

SUMMARY

In light of the above-described issues, an object of the present invention is to detect the generation of noise that dynamically changes depending on the behavior of a target, in an FMCW radar device.

To achieve the above-described object, according to a first aspect of the present invention, an FMCW radar device is provided that includes: a transmission unit that transmits a transmission signal that has a rising portion in which the frequency successively increases and a falling portion in which the frequency successively decreases; a reception unit that receives a reception signal resulting from the transmission signal being reflected by a target and outputs a beat signal based on the transmission signal and the reception signal; and a control unit that determines whether or not three or more targets that have the same relative speed are present at the same orientation among a plurality of targets extracted from a plurality of peak frequencies in each of the rising portion and the falling portion of the beat signal, and when determined that three or more targets are present, gives notification that oscillation has occurred in a power supply bias circuit that supplies power supply voltage to the transmission unit or the reception unit.

In the above-described FMCW radar device, the control unit may include an acquiring means, an orientation estimating means, a pair matching means, a targeting means, a grouping means, an oscillation determining means, and a notifying means.

The acquiring means acquires the beat signal outputted from the reception unit. The orientation estimating means identifies a plurality of peak frequencies in each of the rising portion and the falling portion of the beat signal acquired by the acquiring means, and estimates a reception orientation for each of the identified plurality of peak frequencies. The pair matching means extracts a plurality of pairs of peak frequencies corresponding to the same target, between the plurality of peak frequencies in the rising portion and the plurality of peak frequencies in the falling portion. The targeting means calculates the distance to the target corresponding to the pair and the relative speed of the target, and generates target data for each of the extracted plurality of pairs. The grouping means groups each pair group that corresponds to the same object among the plurality of pairs and sets the pair group as a single target. The oscillation determining means determines whether or not the plurality of targets acquired by the grouping means meet a predetermined oscillation condition. The notifying means gives notification that oscillation has occurred in the power supply bias circuit that supplies a power supply voltage to the transmission unit or the reception unit, when the oscillation determining means determines that the plurality of targets meet the predetermined oscillation condition. The predetermined oscillation condition may be a condition that three or more targets having the same relative speed are present at the same orientation, among the plurality of targets acquired by the grouping means.

In the above-described FMCW radar device, the predetermined oscillation condition may be a condition that three or more targets having the same relative speed are present at the same orientation, among the plurality of groups acquired by the grouping means, and when three target among the three or more targets are A, B, C in order from the shortest distance to the three targets, a relationship B−A=C−B is established.

The control unit may repeatedly and sequentially operate the acquiring means, the orientation estimating means, the pair matching means, the targeting means, the grouping means, and the oscillation determining means. The predetermined oscillation condition may be a condition that detection of the three or more targets determined to have the same relative speed and be at the same orientation, among the plurality of targets acquired by the grouping means, is started at the same time.

The control unit may repeatedly and sequentially operate the acquiring means, the orientation estimating means, the pair matching means, the targeting means, the grouping means, and the oscillation determining means. The predetermined oscillation condition may be a condition that detection of the three or more targets determined to have the same relative speed and be at the same orientation, among the plurality of targets acquired by the grouping means, has stopped at the same time.

The control unit may repeatedly and sequentially operate the acquiring means, the orientation estimating means, the pair matching means, the targeting means, the grouping means, and the oscillation determining means. The notifying means may give a notification that oscillation has occurred in the power supply bias circuit that supplies a power supply voltage to the transmission unit or the reception unit, when the oscillation determining means determines that the plurality of targets meet the predetermined oscillation condition a predetermined number of times.

According to a second aspect of the present invention, a noise detection method for an FMCW radar device is provided in which: a transmission unit transmits a transmission signal that has a rising portion in which the frequency successively increases and a falling portion in which the frequency successively decreases; a reception unit receives a reception signal resulting from the transmission signal being reflected by a target and outputs a beat signal based on the transmission signal and the reception signal; and a control unit determines whether or not three or more targets that have the same relative speed are present at the same orientation among a plurality of targets extracted from a plurality of peak frequencies in each of the rising portion and the falling portion of the beat signal, and when determined that three or more targets are present, gives notification that oscillation has occurred in a power supply bias circuit that supplies power supply voltage to the transmission unit or the reception unit.

In the above-described noise detection method for an FMCW radar device, the control unit may acquire the beat signal outputted from the reception unit; identify a plurality of peak frequencies in each of the rising portion and the falling portion of the acquired beat signal, and estimate a reception orientation for each of the identified plurality of peak frequencies; extract a plurality of pairs of peak frequencies corresponding to the same target, between the plurality of peak frequencies in the rising portion and the plurality of peak frequencies in the falling portion; calculate the distance to the target corresponding to the pair and the relative speed of the target, and generate target data for each of the extracted plurality of pairs; group each pair group that corresponds to the same object among the plurality of pairs and set the pair group as a single target; determine whether or not the acquired plurality of targets meet a predetermined oscillation condition that three or more targets having the same relative speed are present at the same orientation; and give notification that oscillation has occurred in the power supply bias circuit that supplies a power supply voltage to the transmission unit or the reception unit, when the plurality of targets are determined to meet the predetermined oscillation condition.

In the above-described FMCW radar device, whether or not three or more targets that have the same relative speed are present at the same orientation, among the plurality of targets, is determined. Notification of oscillation in the power supply bias circuit is given based on the determination that the three or more targets are present. As a result, generation of noise that dynamically changes depending on the behavior of the target can be detected. A reason for this is that, when noise is applied to the transmission unit and the reception unit as a result of oscillation in the power supply bias circuit, a plurality (theoretically three or more) of targets having the same relative speed and differing distances are observed at the same orientation in the control unit.

The reference numbers within the parentheses in the scope of claims indicate the corresponding relationships between the terms recited in the scope of claims and the specifics exemplifying the terms described in the embodiments described hereafter.

DESCRIPTION OF EMBODIMENTS

First Embodiment

Figure 1:
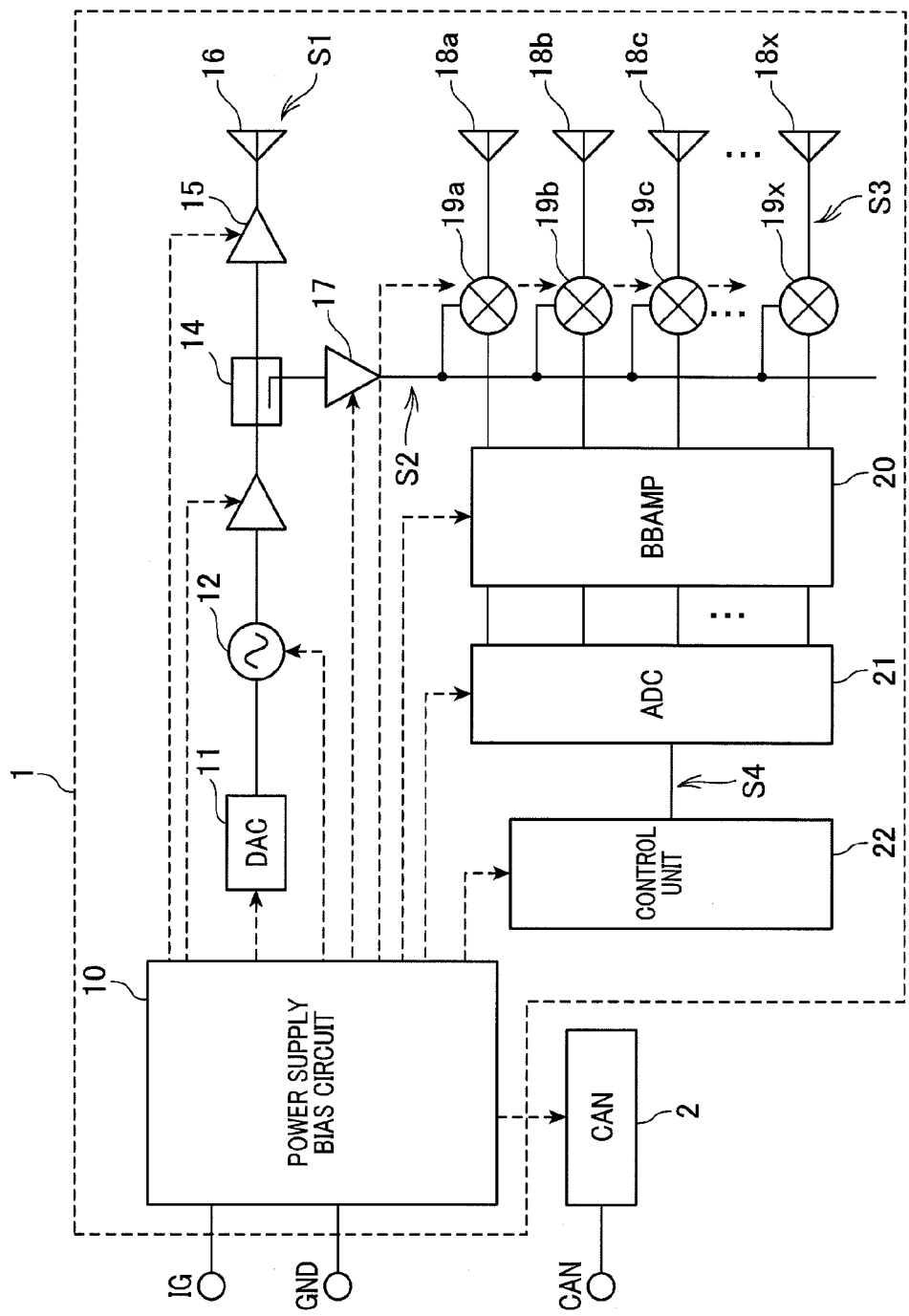
FIG. 1 is a configuration diagram of an FMCW radar device according to an embodiment of the present invention.

A first embodiment of the present invention will hereinafter be described. An FMCW radar device 1 according to the present embodiment, shown in FIG. 1, is mounted in a vehicle. The FMCW radar device 1 emits a millimeter-waveband radio wave in the advancing direction of the own vehicle, such as ahead of the own vehicle, and receives radio waves that have been reflected by a target, such as a leading vehicle or an obstacle, as incoming waves. The FMCW radar device 1 thereby determines the distance from the own apparatus to the target and the relative speed of the target in relation to the own apparatus.

As shown in FIG. 1, the FMCW radar device 1 for a vehicle is mounted in a vehicle and includes a digital-to-analog converter (DAC) 11, a voltage-controlled oscillator (VCO) 12, a buffer amplifier (BA) 13, a distributor 14, a power amplifier (PA) 15, and a transmission antenna 16, as a transmission unit. The FMCW radar device 1 also includes a local amplifier (LA) 17, a plurality of reception antennas 18a, 18b, 18c, . . . 18x, and a plurality of mixers 19a, 19b, 19c, . . . 19x that correspond one-to-one to the reception antennas 18a, 18b, 18c, . . . 18x, as a reception unit. The FMCW radar device 1 further includes a baseband amplifier (BBAMP) 20, an analog-to-digital converter (ADC) 21, and a control unit 22.

In addition, the vehicle includes a controller area network (CAN) 2 that serves as an in-vehicle local area network (LAN), the FMCW radar device 1, and a power supply bias circuit 10 that supplies power supply voltage to the CAN 2. An ignition (IG) line and a ground (GND) line of the vehicle are inputted to the power supply bias circuit 10. When the IG is turned ON, the power supply bias circuit 10 supplies a predetermined direct-current power supply voltage to each unit 11, 12, 13, 15, 17, 19, 20, 22, and 22, the CAN 2, and the like of the FMCW radar device 1.

The DAC 11 is a DA converter that converts a triangular-wave digital signal that has a predetermined length and has been inputted from the control unit 22 to the adjustment level of the VCO 12, and outputs the signal as a triangular-wave analog modulation signal that has a predetermined cycle.

The VCO 12 outputs a signal (corresponding to a normal signal) that has been frequency-modulated by the triangular-wave analog modulation signal inputted from the DAC 11. The BA 13 amplifies this signal and outputs the amplified signal. The signal outputted from the VCO 12 is a millimeter-waveband signal (such as a signal that has a center frequency of 50 GHz and a frequency fluctuation range of 300 MHz). More specifically, the signal has a rising portion in which the frequency linearly and successively increases synchronously with the inputted triangular-wave analog modulation signal and a falling portion in which the frequency linearly and successively decreases immediately after the rising portion.

A distributor 14 electrically distributes the signal outputted from the amplifier 2 in two directions, thereby generating a local signal and a transmission signal. The transmission signal from the distributor 14 is inputted to the PA 15 and amplified. The local signal is amplified by the LA 17 and inputted to the plurality of mixers 19a to 19x.

The transmission signal that has been amplified by the PA 15 is inputted to the antenna 16. As a result, a millimeter-wave transmission signal that has the rising portion in which the frequency linearly and successively increases and the falling portion in which the frequency linearly and successively decreases immediately after the rising portion is transmitted from the antenna 16.

The plurality of reception antennas 18a to 18x are disposed in an array in a horizontal direction and together configure a single array antenna. Each of the plurality of reception antennas 18a to 18x receives a reception signal that results from being transmitted from the transmission antenna 16 and reflected by an object.

Each of the plurality of mixers 19a to 19x generates a known beat signal by mixing the reception signal received by the corresponding reception antenna and the local signal transmitted from the distributor 14, and outputs the beat signal. The frequency of the beat signal generated at this time is referred to as a beat frequency. The beat frequency of the rising portion in which the frequency of the transmission signal increases is referred to as an upward-modulation beat frequency. The beat frequency of the falling portion in which the frequency of the transmission signal decreases is referred to as a downward-modulation beat frequency. The upward-modulation beat frequency and the downward-modulation beat frequency are used in the calculation of distance and relative speed of an object by the FMCW method.

The BBAMP 20 amplifies the beat signal outputted from each of the plurality of mixers 19a to 19x and inputs the amplified beat signals to the ADC 21. The ADC 21 is an AD converter that converts the beat signal inputted from BBAMP 20 to a digital signal and inputs the digital signal to the control unit 22.

The control unit 22 inputs the triangular-wave digital signal that has a predetermined frequency to the DAC 11, at a predetermined sampling timing that periodically and repeatedly arrives, as described above. In addition, the control unit 22 acquires each beat signal inputted from the ADC 21 and performs a process described hereafter, thereby calculating the distance from the own apparatus to a target, the orientation of the target from the perspective of the own apparatus, and the relative speed of the target in relation to the own apparatus. The control unit 22 then transmits the distance, orientation, and relative speed to an on-board apparatus, such as a pre-crash control electronic control unit (ECU), via the CAN 2.

The operation of the FMCW radar device 1, configured as described above, will be described hereafter. At each predetermined sampling timing that periodically and repeatedly arrives, the control unit 22 inputs the triangular-wave digital signal that has a predetermined frequency to the DAC 11, as described above, and at the same time performs the process shown in FIG. 2.

Figure 2:
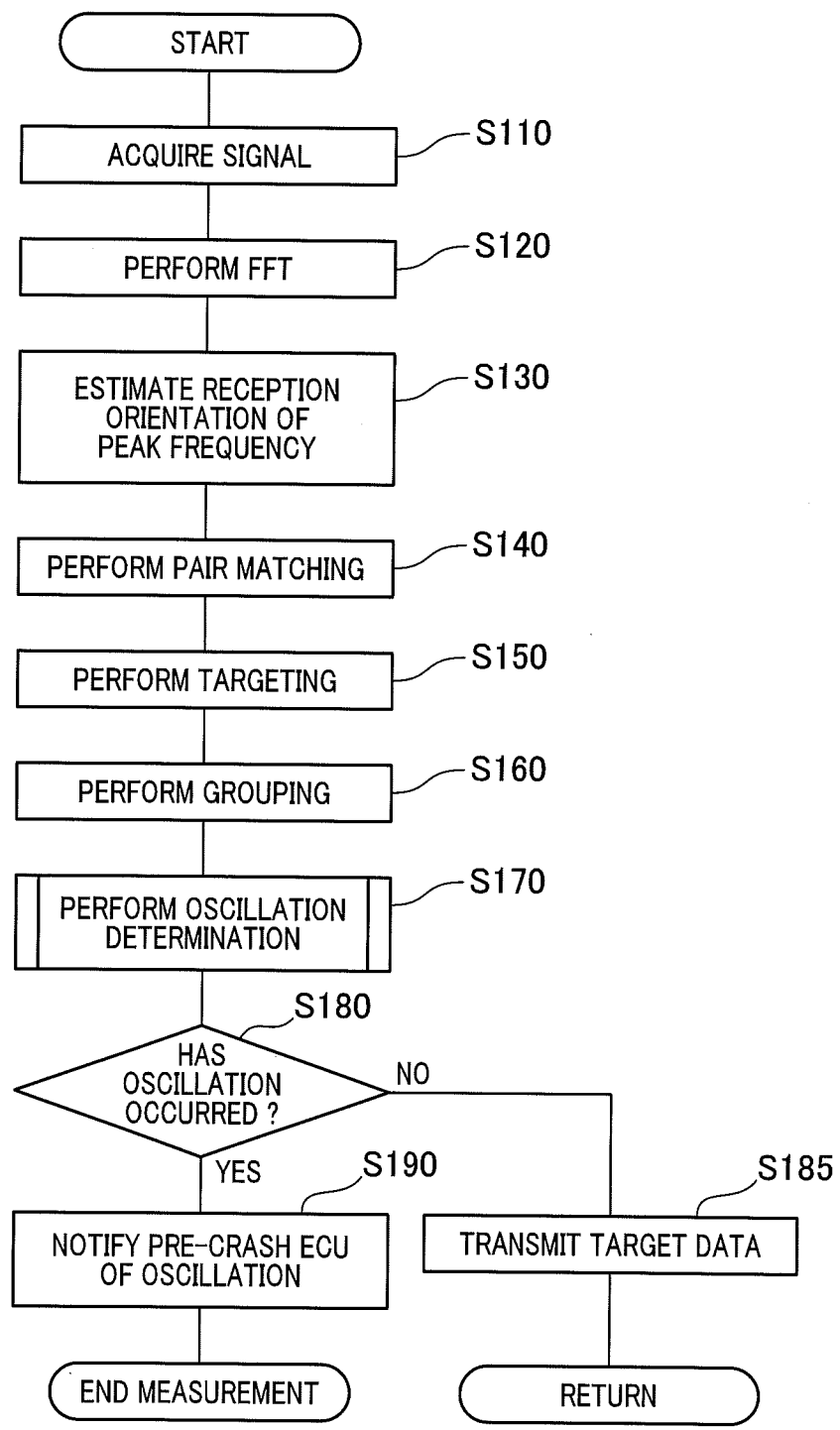
FIG. 2 is a flowchart of a process performed by a control unit of the FMCW radar device shown in FIG. 1.

In the process shown in FIG. 2, first, at step S110, the control unit 22 acquires the beat signal of each channel inputted from the ADC 21. Here, the channel is a concept that corresponds one-to-one to each of the above-described plurality of reception antennas configuring the array antenna. For example, the beat signal of the channel of the reception antenna 18a is a beat signal that has been generated from the reception signal received by the reception antenna 18a. Each acquired beat signal is that of a single sweep. The single sweep is a period composed of a pair of the rising portion and the falling portion immediately after the rising portion of the transmitted wave.

Next, the control unit 22 proceeds to step S120 and independently performs fast Fourier transform (FFT) on the above-described rising portion and falling portion of the beat signal of each channel. As a result, frequency-strength characteristics of the rising portion and frequency-strength characteristics of the falling portion are obtained for each channel.

Next, at step S130, the control unit 22 identifies a single peak frequency (the same overall number as the number of targets) for each target (may be none, one, or a plurality of targets) in the rising portion, based on the frequency-strength characteristics of the rising portion for each channel acquired at step S120. The control unit 22 then estimates the reception orientation (corresponding to the orientation of the corresponding target) corresponding to the peak frequency.

Furthermore, the control unit 22 identifies a single peak frequency (the same overall number as the number of targets) for each target (may be none, one, or a plurality of targets) in the falling portion, based on the frequency-strength characteristics of the falling portion for each channel acquired at step S120. The control unit 22 then estimates the reception orientation (corresponding to the orientation of the corresponding target) corresponding to the peak frequency.

A known digital beam forming (DBF) technique is used in the estimation of orientation at step S130.

Next, at step S140, the control unit 22 performs pair matching. Specifically, the control unit 22 extracts a pair of peak frequencies that correspond to the same target (a pair composed of a single peak frequency in the falling portion and a single peak frequency in the rising portion) among the peak frequencies in the rising portion and the peak frequencies in the falling portion identified at step S130. The number of pairs that are extracted is the same as the number of targets. Therefore, a plurality of pairs are extracted if there are a plurality of targets.

As the pair matching method, a method is used in which a pair is extracted of which the difference in strengths of the beat signals at the peak frequency (in other words, peak strengths) is within a predetermined strength range, the reception orientations corresponding to the peak frequency are within a predetermined orientation range, and the frequencies are near a frequency that has been estimated from measurement data at a previous sampling timing and are historically connected.

Specifically, a single peak A is selected from the rising portion, and all peaks in the falling portion (other than those that are excluded as described below) of which the difference in reception orientation is within a predetermined orientation range and the difference in peak strength is within a predetermined strength range in relation to the single peak A are extracted. Among the extracted peaks, peak B of which the peak strength is the closest to that of peak A is selected. Peaks A and B form a pair, and peak B is excluded from extraction. This process is repeatedly performed a number of times that has been designated in advance (such as 64 times in order from the highest peak strength in the rising portion).

Next, at step S150, the control unit 22 performs targeting for each pair that has been extracted at step S140. In targeting, the control unit 22 uses the peak frequencies of the subject pair to calculate the distance from the own apparatus to the target corresponding to the subject pair, the relative speed of the target in relation to the own apparatus, and the orientation of the target from the perspective of the own apparatus, and sets the calculation results as target data of the pair.

The method for calculating the above-described distance and relative speed based on the peak frequency in the rising portion and the peak frequency in the falling portion that form a pair is as is well-known. In other words, when the peak frequency in the rising portion is fb1 and the peak frequency in the falling portion is fb2, distance D and relative speed V are $$D=\{C/(8\Delta F \cdot fm)\} \cdot (fb1+fb2)$$

$$V=\{C/(4f0)\} \cdot (fb1-fb2)$$

Here, ΔF represents the frequency shift range of the transmission signal, f0 represents the center frequency of the transmission signal, 1/fm represents the amount of time required for modulation of a single cycle (in other words, a single sweep), and C represents the speed of light.

In addition, in the method for calculating the above-described orientation based on the peak frequency in the rising portion and the peak frequency in the falling portion that form a pair, for example, an average value of the orientations estimated at step S130 for each of the two peak frequencies is used.

Next, at step S160, the control unit 22 performs grouping. In grouping, the control unit 22 groups a pair group that corresponds to the same object (such as an automobile) based on the target data of each pair acquired at step S150. Specifically, the control unit 22 collects, into a single target, each pair group (single or plurality of pairs) that falls within an area substantially amounting to a single vehicle (such as an area within a rectangle that is 5 meters high and 2 meters across) and of which the relative speed is the same, based on the target data of differing pairs. In this case, as the above-described distance, relative speed, and orientation in the target data of the single target, representative values (such as average values) of the above-described distance, relative speed, and orientation of the pair group that has been collected into a single target are used. This grouping method is well known, and a detailed method is described, for example, in JP-A-2003-270348.

Upon completion of step S160, the state is such that the target data has been created for each target that has reflected the transmitted waves from the FMCW radar device 1.

Here, instances will be described in which an oscillation failure or the like occurs in the power supply bias circuit 10, and as a result, noise is superimposed on the supplied voltage to only any one of the reception system, modulation system, BA system, and PA system.

Figure 3:
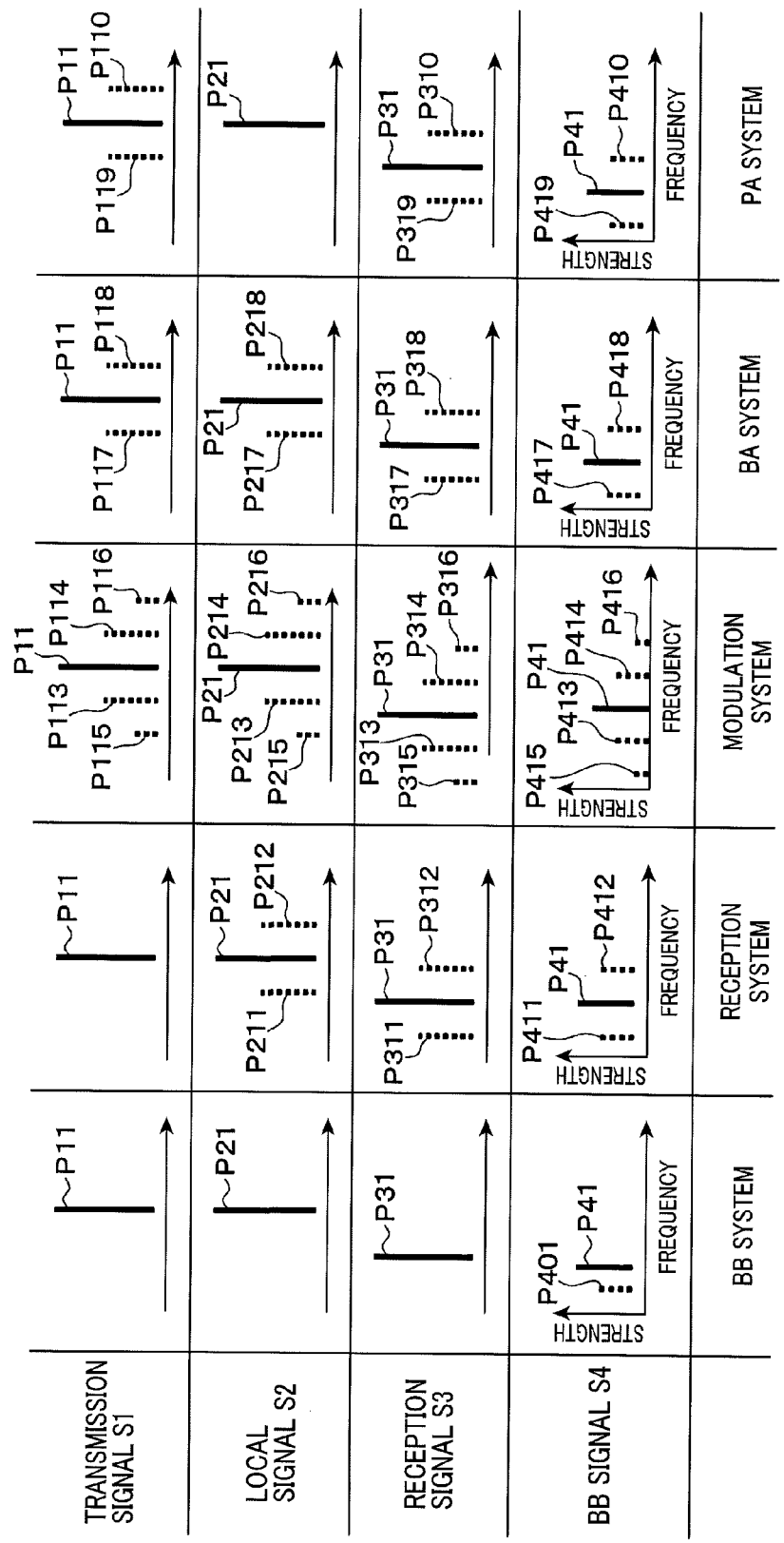
FIG. 3 is a diagram of an example of frequency characteristics when noise is superimposed on supplied voltage from a power supply bias circuit to each unit of the FMCW radar device shown in FIG. 1.

In FIG. 3, examples of frequency characteristics are shown of the instances in which noise is superimposed on supplied voltage to the BB (baseband) system, the reception system, the BA (buffer amplifier) system, and the PA (power amplifier) system. In the examples in FIG. 3, the transmission signal is reflected by only a single target ahead (such as another vehicle) and returns as a reception signal.

Here, the BB system includes the BBAMP 20, the ADC 21, and the control unit 22. The reception system includes the local amplifier 17, the reception antennas 18a to 18x, and the mixers 19a to 19x. In addition, the modulation system includes the DAC 11 and the VCO 12, the BA system includes the BA 13, and the PA system includes the PA 15.

In FIG. 3, each column indicates the frequency characteristics when noise is superimposed on the supplied voltage to a certain single system. The frequency characteristics (a graph in which the horizontal axis indicates frequency and the vertical axis indicates strength) of a transmission signal S1, a local signal S2, a reception signal S3, and a BB signal S4 are indicated in order from the top row. The observation point of each signal is as shown in FIG. 1. The BB signal S4 is a beat signal.

In each graph in FIG. 3, peaks P11, P21, P31, and P41 indicated by solid lines correspond to a signal component derived from a normal signal that is not noise. The peaks indicated by dotted lines correspond to a signal component derived from noise.

BB System Noise

First, an instance will be described in which oscillation having a fixed cycle occurs in the power supply bias circuit 10, and as a result, noise is superimposed on supplied voltage to only the BB system (from mixer output to the ADC 21; for example, ADC 21) among the BB system, the reception system, the BA system, and the PA system. In this case, the transmission signal S1, the local signal S2, and the reception signal S3 are not affected by the oscillation. Therefore, the signals S1, S2, and S3 respectively include only peaks P11, P21, and P31 that are derived from a normal signal. However, in the BB signal S4, peak P401 corresponding to the effect of oscillation noise is generated in addition to peak P41 that is derived from the normal signal.

Even when targeting is performed at step S150 on peak P411 such as this, the target data is generated such that the target has a relative speed of zero because the frequencies of peak P411 do not fluctuate between the rising portion and the falling portion. This occurs regardless of the relative speed of at peak P411 being zero or not zero. Therefore, the target (a false target derived from noise) corresponding to peak P411 is not subject to erroneous recognition as a hazardous object in pre-crash control.

Reception System Noise

Next, an instance will be described in which oscillation having a fixed cycle occurs in the power supply bias circuit 10, and as a result, noise is superimposed on supplied voltage to only the reception system (the mixers 19a to 19x) among the BB system, the reception system, the BA system, and the PA system. In this case, the transmission signal S1 is not affected by the oscillation and includes only peak 11 that is derived from the normal signal.

However, the local signal S2 is AM-modulated by the noise, and as a result, also includes two peaks, peaks P211 and P212 (corresponding to sideband waves), that are separated from peak P21 derived from the normal signal by an amount equivalent to the oscillation frequency (such as 50 kHz) of the power supply bias circuit 10.

In a similar manner, the reception signal S3 is AM-modulated by the noise, and as a result, also includes two peaks, peaks P311 and P312 (corresponding to sideband waves), that are separated from peak P31 derived from the normal signal by an amount equivalent to the oscillation frequency of the power supply bias circuit 10.

Therefore, the BB signal S4 that results from mixing the local signal S2 and the reception signal S3 that include the sideband waves also includes peaks P411 and P412, in addition to peak P41 that is the frequency difference of the frequency of the normal peak P21 and the frequency of the normal peak P31. For example, the frequency of peak P411 is the frequency difference of the frequency of peak P211 and the frequency of peak P311. In addition, the frequency of peak P412 is the frequency difference of the frequency of peak P212 and the frequency of peak P312. The frequencies of peaks P411 and P412 such as these fluctuate so as to synchronously track the fluctuations over time in the frequency of the normal peak P41.

In such a case, at above-described step S110, a beat signal (BB signal S4) including peaks P41, P411, and P412 in the rising portion and the falling portion in each channel is acquired. At step S120, the FFT process is performed separately for the rising portion and the falling portion for each channel, and at step S130, the reception orientation is estimated for each peak in the rising portion and each peak in the falling portion.

Because the sideband waves corresponding to peaks P411 and P412 are reflected and returned by the same actual target as the normal signal corresponding to peak P41, the reception orientations estimated for peaks P411 and P412 are the same as that of peak P41. Therefore, the orientation recognized for the false target corresponding to peaks P411 and P412 is the same as the orientation of the actual target corresponding to peak P41.

Then, at step S140, pair matching is performed. In pair matching, peaks P41, P411, and P412 in the rising portion and peaks P41, P411, and P412 in the falling portion have the same reception orientation. However, the peak strengths of peaks P411 and P412 in the rising portion and the falling portion are significantly far from the peak strength of peak P41 in the rising portion and the falling portion, so as to exceed the above-described predetermined strength range. However, because the peak strengths of peaks 411 and 412 are substantially the same in the rising portion and the falling portion, the difference falls within the above-described strength range. In a similar manner, because the peak strength of peak 41 is substantially the same in the rising portion and the falling portion, the difference falls within the above-described strength range.

Therefore, in pair matching, peak P41 in the rising portion and peak P41 in the falling portion form a pair. In addition, of peaks P411 and P412 in the falling portion, the peak of which the peak strength is closest to that of peak P411 in the rising portion is peak P411 in the falling portion. Therefore, peak P411 in the rising portion and peak P411 in the falling portion form a pair. In addition, of peaks P411 and P412 in the falling portion, the peak of which the peak strength is closest to that of peak P412 in the rising portion is peak P412 in the falling portion. Therefore, peak P412 in the rising portion and peak P412 in the falling portion form a pair. Peaks P411 and P412 in the rising portion have substantially the same strength. In addition, peaks P411 and P412 in the falling portion have substantially the same strength. However, when peak P411 in the rising portion and peak P412 in the falling portion, and peak P412 in the rising portion and peak P411 in the falling portion form pairs, the relative speed is extremely high (such as 350 km/h or higher) and there is no historical connection to the previous measurement value. Therefore, the historically connected peak P411 in the rising portion and peak P411 in the falling portion, and peak P412 in the rising portion and peak P412 in the falling portion form pairs.

Next, at step S150, targeting is performed on the pair of peaks P41 in the rising portion and the falling portion, the pair of peaks P411 in the rising portion and the falling portion, and the pair of peaks P412 in the rising portion and the falling portion.

The frequencies of peaks P411 and P412 fluctuate so as to synchronously track peak P41 (in other words, fluctuate by the same amount as peak P41). Therefore, in the target data, the relative speeds V of the targets corresponding to peaks P411 and P412 (although the targets are false targets derived from noise) are the same as that of the target corresponding to peak P41 (actual target). In other words, when the actual target (such as an automobile) corresponding to peak 41 is approaching at a relative speed V1 (greater than zero), the false targets corresponding to peaks P411 and P412 are also recognized as approaching at the same relative speed V1. In addition, in the target data, the amount of change over time in the distances D of the false targets corresponding to peaks P411 and P412 is the same as that of the actual target corresponding to peak P41.

However, the frequencies of peaks P411 and P412 are shifted in the increasing direction and the decreasing direction in relation to that of peak 41 by an amount equivalent to the oscillation frequency of the power supply bias circuit 10, in both the rising portion and the falling portion. Therefore, in the target data, distance D411 (distance from the own apparatus) of the false target corresponding to peak P411 is shorter by a predetermined distance L than distance D41 of the actual target corresponding to the peak P41. In addition, distance D412 (distance from the own apparatus) of the false target corresponding to peak P412 is longer by the same predetermined distance L than distance D41 of the actual target corresponding to the peak P41.

In most cases, this predetermined distance L is significantly longer than the size (several meters) of a single vehicle. For example, when the frequency shift range Δf of the transmission signal is 300 MHz, the amount of time 1/fm required for modulation of a single cycle (in other words, a single sweep) is 3 ms, and the oscillation frequency of the power supply bias circuit 10 is 50 kHz, the predetermined distance L is about 75 m.

Therefore, in grouping performed at step S160, the false targets corresponding to peaks P411 and P412 (the pairs composed of the peak in the rising portion and the peak in the falling portion) are not grouped with the actual target corresponding to peak P41 and are considered to be separate targets.

Modulation System Noise

Next, an instance will be described in which oscillation having a fixed cycle occurs in the power supply bias circuit 10, and as a result, noise is superimposed on supplied voltage to only the modulation system (the DAC 11 or the VCO 12) among the BB system, the reception system, the BA system, and the PA system.

In this instance, the transmission signal S1 and the local signal S2 are FM-modulated by the noise, and as a result, includes peaks P113 to P116 and P213 to P216 that correspond to numerous sideband waves in the frequencies above and below peaks P11 and P21 derived from the normal signal. Peaks P113 to P116 and P213 to P216 have frequencies corresponding to the oscillation frequency of the power supply bias circuit 10 and the integral multiples thereof. The transmission signal S1 that includes the sideband waves of peaks P113 to P116 in this way is transmitted from the transmission antenna 16, reflected by the actual target, and returns as a received wave S3. Therefore, the reception signal S3 includes peaks P31 and P313 to P316 that result from peaks P11 and P113 to P116 of the transmission signal being similarly Doppler-displaced.

Therefore, the BB signal S4 that results from mixing the local signal S2 including peaks P21 and P213 to P216 and the reception signal S3 including peaks P31 and P313 to P316 also includes peaks P413 to P416, in addition to peak P41 that is the frequency difference (although being an absolute value) of the frequency of the normal peak P21 and the frequency of the normal peak P31

For example, the frequency of peak P413 is the frequency difference of the frequency of peak P213 and the frequency of peak P313. In addition, the frequency of peak P414 is the frequency difference of the frequency of peak P214 and the frequency of peak P314. The frequencies of peaks P413 to P416 such as these fluctuate so as to synchronously track the fluctuations over time in the frequency of the normal peak P41.

In such a case, at above-described step S110, a beat signal (BB signal S4) including peaks P41 and P413 to P416 in the rising portion and the falling portion in each channel is acquired. At step S120, the FFT process is performed separately for the rising portion and the falling portion for each channel, and at step S130, the reception orientation is estimated for each peak in the rising portion and each peak in the falling portion.

Because the sideband waves corresponding to peaks P413 to P416 are reflected and returned by the same actual target as the normal signal corresponding to peak P41, the reception orientations estimated for peaks P413 to P416 are the same as that of peak P41. Therefore, the orientation recognized for the false targets corresponding to peaks P413 to P416 is the same as the orientation of the actual target corresponding to peak P41.

Then, at step S140, pair matching is performed. In pair matching, peaks P41 and P413 to P416 in the rising portion and peaks P41 and P413 to P416 in the falling portion have the same reception orientation. However, the peak strengths of peaks P413 to P416 in the rising portion and the falling portion are significantly far from the peak strength of peak P41 in the rising portion and the falling portion, so as to exceed the above-described predetermined strength range.

Therefore, in pair matching, peak P41 in the rising portion and peak P41 in the falling portion form a pair. In addition, among peaks P413 to P416 in the falling portion, the peak of which the peak strength is closest to that of peak P413 in the rising portion is peak P413 in the falling portion. Therefore, peak P413 in the rising portion and peak P413 in the falling portion form a pair. Peaks P413 and P414 in the rising portion have substantially the same strength. In addition, peaks P413 and P414 in the falling portion have substantially the same strength. However, when these peaks respectively form pairs, based on the historical connection with the measurement results at the previous sampling timing, peak P413 in the rising portion and peak P413 in the falling portion, and peak P414 in the rising portion and peak P414 in the falling portion respectively form pairs. In a similar manner, peaks 415 in the rising portion and the falling portion, and peaks 416 in the rising portion and the falling portion each form a pair.

Next, at step S150, targeting is performed on the pair of peaks P41 in the rising portion and the falling portion, and each of the pairs of peaks P413 to P416 in the rising portion and the falling portion.

The frequencies of peaks P413 to P416 fluctuate so as to synchronously track peak P41 (in other words, fluctuate by the same amount as peak P41). Therefore, in the target data, the relative speeds V of the false targets corresponding to peaks P413 to P416 are the same as that of the target corresponding to peak P41 (actual target). In other words, when the actual target (such as an automobile) corresponding to peak 41 is approaching at the relative speed V1 (greater than zero), the false targets corresponding to peaks P413 to P416 are also recognized as approaching at the same relative speed V1. In addition, in the target data, the amount of change over time in the distances D of the false targets corresponding to peaks P413 to P416 is the same as that of the actual target corresponding to peak P41.

However, the frequencies of peaks P413 to P416 are each shifted in the increasing direction and the decreasing direction in relation to that of peak 41, in both the rising portion and the falling portion. Therefore, in the target data, the distance of the corresponding target (distance from the own apparatus) successively increases by the same predetermined distance L in order from peaks P415, P413, P41, P414, to P416.

In most cases, this predetermined distance L is significantly longer than the size (several meters) of a single vehicle. For example, when the frequency shift range Δf of the transmission signal is 300 MHz, the amount of time 1/fm required for modulation of a single cycle (in other words, a single sweep) is 3 ms, and the oscillation frequency of the power supply bias circuit 10 is 50 kHz, the predetermined distance L is about 75 m.

BA System Noise

Next, an instance will be described in which oscillation having a fixed cycle occurs in the power supply bias circuit 10, and as a result, noise is superimposed on supplied voltage to only the BA system (the BA 13) among the BB system, the reception system, the BA system, and the PA system.

In this instance, the transmission signal S1 and the local signal S2 are AM-modulated by the noise, and as a result, also include two peaks, P117 and P118, and P217 and P218 (corresponding to sideband waves), that are separated from peaks P11 and P21 derived from the normal signal by an amount equivalent to the oscillation frequency (such as 50 kHz) of the power supply bias circuit 10.

The transmission signal S1 that includes the sideband waves of peaks P117 and P118 in this way is transmitted from the transmission antenna 16, reflected by the actual target, and returns as the received wave S3. Therefore, the reception signal S3 includes peaks P31, P317, and P318 (corresponding to sideband waves) that result from peaks P11. P117, and P118 of the transmission signal being similarly Doppler-displaced.

Therefore, the BB signal S4 that results from mixing the local signal S2 and the reception signal S3 including these sideband waves also includes peaks P417 and P418, in addition to peak P41 that is the frequency difference of the frequency of the normal peak P21 and the frequency of the normal peak P31. For example, the frequency of peak P417 is the frequency difference of the frequency of peak P217 and the frequency of peak P317. In addition, the frequency of peak P418 is the frequency difference of the frequency of peak P218 and the frequency of peak P318. The frequencies of peaks 417 and 418 such as these fluctuate so as to synchronously track the fluctuations over time in the frequency of the normal peak P41.

The properties of these peaks P417 and P418 are the same as those of above-described peaks 411 and 412. Therefore, the processing details regarding peaks P417 and P418 at steps S110 to S160 are the same as the processing details regarding peaks 411 and 412. Thus, descriptions are omitted.

Because the sideband waves corresponding to peaks P417 and P418 are reflected and returned by the same actual target as the normal signal corresponding to peak P41, the reception orientations estimated for peaks P417 and P418 are the same as that of peak P41. Therefore, the orientation recognized for the false targets corresponding to peaks P417 and P418 is the same as the orientation of the actual target corresponding to peak P41.

PA System Noise

Next, an instance will be described in which oscillation having a fixed cycle occurs in the power supply bias circuit 10, and as a result, noise is superimposed on supplied voltage to only the PA system (the PA 15) among the BB system, the reception system, the BA system, and the PA system. In this case, the local signal S2 is not affected by the oscillation and includes only peak P21 derived from the normal signal.

However, the transmission signal S1 is AM-modulated by the noise, and as a result, also includes two peaks, P119 and P110 (corresponding to sideband waves), that are separated from peak P11 derived from the normal signal by an amount equivalent to the oscillation frequency (such as 50 Hz) of the power supply bias circuit 10.

The transmission signal S1 that includes the sidewave bands of peaks P119 and P110 in this way is transmitted from the transmission antenna 16, reflected by the actual target, and returns as the received wave S3. Therefore, the reception signal S3 includes peaks P31, P319, and P310 that result from peaks P11, P119, and P110 of the transmission signal being similarly Doppler-displaced.

Therefore, the BB signal S4 that results from mixing the local signal S2 and the reception signal S3 including these sideband waves also includes peaks P419 and P410, in addition to peak P41 that is the frequency difference of the frequency of the normal peak P21 and the frequency of the normal peak P31. For example, the frequency of peak P419 is the frequency difference of the frequency of peak P219 and the frequency of peak P319. In addition, the frequency of peak P410 is the frequency difference of the frequency of peak P210 and the frequency of peak P310. The frequencies of peaks 419 and P410 such as these fluctuate so as to synchronously track the fluctuations over time in the frequency of the normal peak P41.

The properties of these peaks P419 and P410 are the same as those of above-described peaks 411 and 412. Therefore, the processing details regarding peaks P419 and P410 at steps S110 to S160 are the same as the processing details regarding peaks P411 and P412. Thus, descriptions are omitted.

Because the sideband waves corresponding to peaks P419 and P410 are reflected and returned by the same actual target as the normal signal corresponding to peak P41, the reception orientations estimated for peaks P419 and P410 are the same as that of peak P41. Therefore, the orientation recognized for the false targets corresponding to peaks P419 and P410 is the same as the orientation of the actual target corresponding to peak P41.

Figure 4:
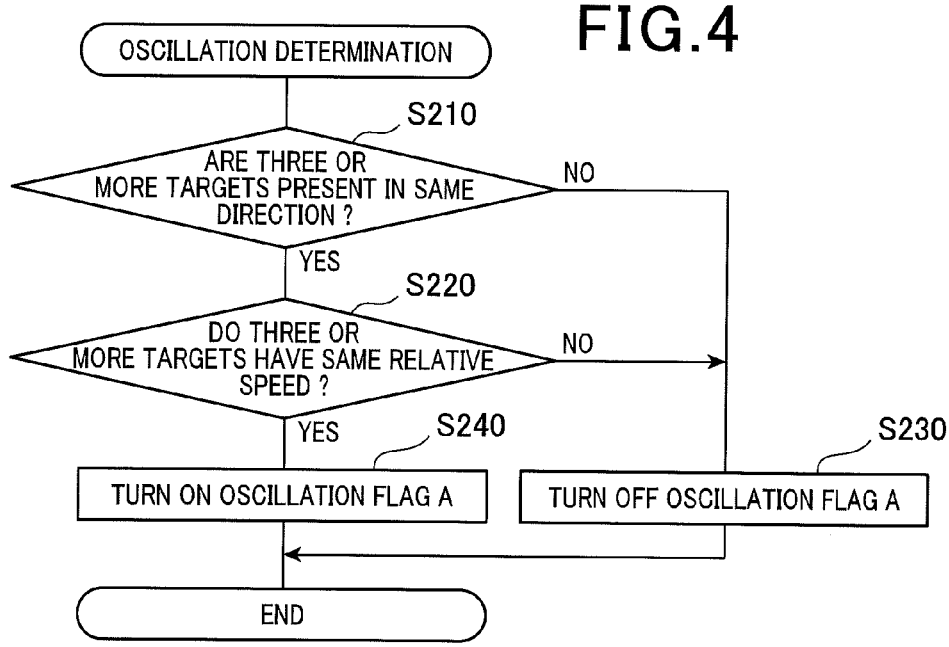
FIG. 4 is a flowchart of the details of an oscillation determination process for the power supply bias circuit performed by the FMCW radar device according to a first embodiment.

Here, returning to the description of the process in FIG. 2, after performing grouping at step S160, the control unit 22 performs oscillation determination at step S170. In oscillation determination, as shown in FIG. 4, first, at step S210, the control unit 22 determines whether or not three or more targets are present at the same orientation based on the target data that results from grouping at the immediately preceding step S160. More specifically, the control unit 22 determines that three or more targets are present at the same orientation when three or more targets are included within a predetermined angle range. The predetermined angle range is about 0.7 degrees.

When determined that three or more targets are not present at the same orientation at step S210, the control unit 22 proceeds to step S230. When determined that three or more targets are present at the same orientation, the control unit 22 proceeds to step S220. At step S220, the control unit 22 further determines whether or not three or more targets have the same relative speed, among the three or more targets determined to be at the same orientation. More specifically, the control unit 22 further determines that three or more targets have the same relative speed when, among the three or more targets determined to be at the same orientation, three or more targets are included within a predetermined speed range. The predetermined speed range is about 4 km/h or less.

When further determined that three or more targets do not have the same relative speed at step S220, the control unit 22 proceeds to step S230. When further determined that three or more targets have the same relative speed, the control unit 22 proceeds to step S240. At step S230, the control unit 22 turns OFF an oscillation flag A and completes oscillation determination. At step S240, the control unit 22 turns ON the oscillation flag A and completes oscillation determination.

In this way, the oscillation flag A is turned ON when a predetermined oscillation condition is met (the condition being that three or more targets having the same relative speed are present at the same orientation, among the plurality of targets acquired at step S160). The oscillation flag A is turned OFF when the predetermined oscillation condition is not met.

Here, as described above, when oscillation having a fixed cycle occurs in the power supply bias circuit 10, and as a result, noise is superimposed on supplied voltage to only the BB system, peak P401 derived from noise is recognized as being a stationary target, regardless of the relative speed of the actual target corresponding to peak P41. Therefore, as long as the actual target is not moving in relation to the own vehicle, the relative speeds of the target corresponding to peak P401 and the target corresponding to peak P41 do not become the same. Thus, the control unit 22 proceeds from step S210 to step S230 and turns OFF the oscillation flag A.

However, as described above, when oscillation having a fixed cycle occurs in the power supply bias circuit 10, and as a result, noise is superimposed on supplied voltage to the reception system, the BA system, or the PA system, three targets (more than three in the case of noise in the modulation system) are recognized that are at the same orientation from the perspective of the FMCW radar device 1 and have the same relative speed in relation to the FMCW radar device 1, as described above. Therefore, the control unit 22 proceeds through steps S210, S220, and S240 and turns ON the oscillation flag A.

After performing oscillation determination at step S170, the control unit 22 proceeds to step S180 and determines whether or not oscillation has occurred in the power supply bias circuit 10 based on the result of oscillation determination. Specifically, the control unit 22 determines that oscillation has occurred in the power supply bias circuit 10 when the oscillation flag A is turned ON, and proceeds to step S190. The control unit 22 determines that oscillation has not occurred in the power supply bias circuit 10 when the oscillation flag A is turned OFF, and proceeds to step S185.

At step S185, the control unit 22 transmits the target data that results from grouping at the immediately preceding step S160 to the pre-crash control ECU, via the CAN 2. Upon receiving the target data, the pre-crash control ECU performs known pre-crash control. For example, the pre-crash ECU determines whether or not a target is present that is approaching at a predetermined relative speed or higher within a predetermined distance from the FMCW radar device 1. The pre-crash ECU operates automatic braking, operates a pretensioner, outputs an alert sound, and the like in preparation for a collision with the target only when determined that a target is present. After step S185, the control unit 22 returns to step S110 after waiting for the next sampling timing.

At step S190, the control unit 22 outputs a signal indicating that oscillation has occurred in the power supply bias circuit 10 to the pre-crash control ECU, via the CAN 2. After step S190, because the likelihood of abnormality in the power supply bias circuit 10 and erroneous detection being performed is high, distance measurement is completed. In other words, the process in FIG. 2 (target data generation and transmission, and the like) is no longer repeated.

In this way, when noise is applied to the transmission unit (modulation system, BA system, and PA system) and the reception unit (reception system) as a result of oscillation in the power supply bias circuit, a plurality (theoretically three or more) of targets having the same relative speed and differing distances are observed at the same orientation in the control unit 22.

Therefore, as described above, whether or not three or more targets that have the same relative speed are present at the same orientation, among the plurality of groups (in other words, the targets that have been grouped at step S160), is determined. Based on the determination that the three or more such targets are present, notification is given of the oscillation in the power supply bias circuit, thereby enabling the generation of noise that dynamically changes depending on the behavior of the target to be detected.

Second Embodiment

Next, a second embodiment of the present invention will be described. The present embodiment differs from the first embodiment only regarding the details of the oscillation determination (step S170) in FIG. 2, performed by the control unit 22. Specifically, the control unit 22 performs a determination process shown in FIG. 5 instead of the determination process shown in FIG. 4. In the processes in FIG. 4 and FIG. 5, the processing details are the same for steps having the same step numbers. The process in FIG. 5 will be described hereafter, mainly focusing on the difference with the process in FIG. 4.

When determined that three or more targets that have the same relative speed are present at step S220, the control unit 22 proceeds to step S225. At step S225, the control unit 22 extracts three targets in order from that having the shortest distance (distance from the FMCW radar device 1), among the three or more targets determined to have the same relative speed and be at the same orientation. Then, the control unit 22 determines whether or not the three targets are aligned at an even interval based on the target data of the extracted targets.

Specifically, the determination is made based on whether or not a relationship B–A=C–B is established, when the three extracted targets are A, B, and C in order from the shortest distance from the FMCW radar device 1 to the three targets. However, when the difference between B–A and C–B is a predetermined amount or less (such as 1 meter), a determination is made that the relationship B–A=C–B is established.

When determined that the relationship B–A=C–B is established, the control unit 22 proceeds to step S240 and turns ON the oscillation flag A. When determined that the relationship B–A=C–B is not established, the control unit 22 proceeds to step S230 and turns OFF the oscillation flag A.

In this way, the oscillation flag A is turned ON when a predetermined oscillation condition is met (the condition being that, among the plurality of groups acquired at step S160, three or more targets that have the same relative speed are present at the same orientation, and when three targets among the three or more targets are A, B, and C in order from the shortest distance to the three targets, the relationship B–A=C–B is established). The oscillation flag A is turned OFF when the predetermined oscillation condition is not met.

In this way, oscillation determination is performed upon further determining whether or not the three targets that have the same relative speed and are at the same orientation are evenly spaced. Therefore, a more highly accurate oscillation determination can be actualized.

Third Embodiment

Next, a third embodiment of the present invention will be described. The present embodiment is that in which the following changes have been made in the first embodiment or the second embodiment. The present embodiment differs from the first and second embodiments only regarding the details of the oscillation determination at step S170 and step S180 in FIG. 2, performed by the control unit 22.

Figure 5:
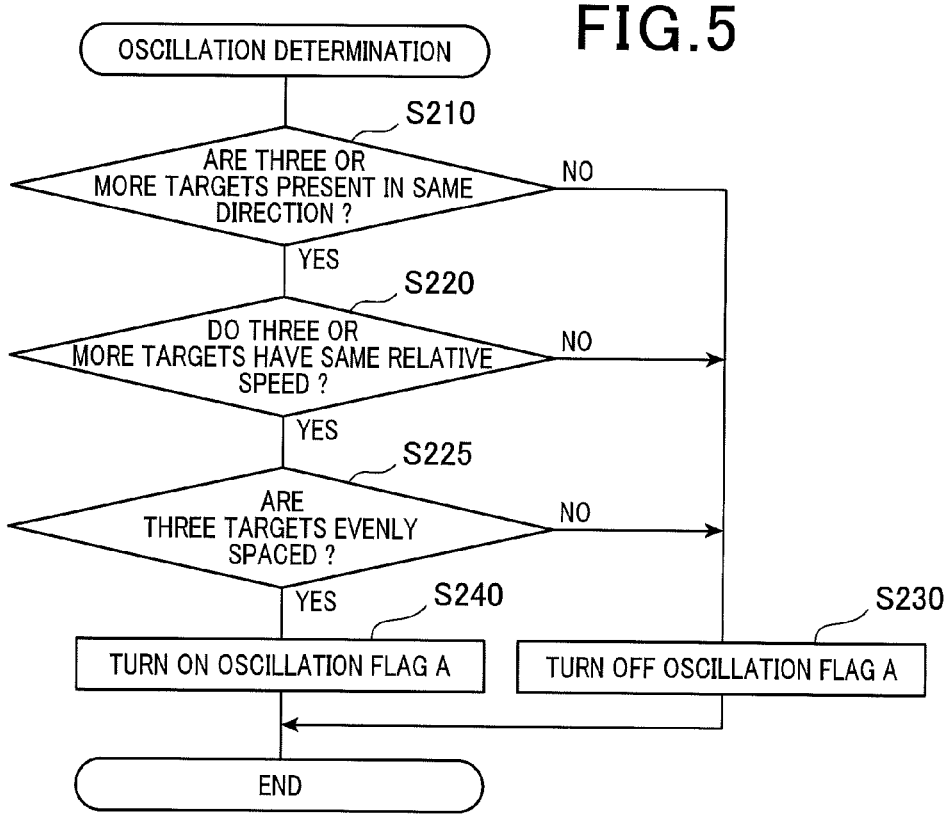
FIG. 5 is a flowchart of the details of an oscillation determination process for a power supply bias circuit performed by an FMCW radar device according to a second embodiment.
Figure 6:
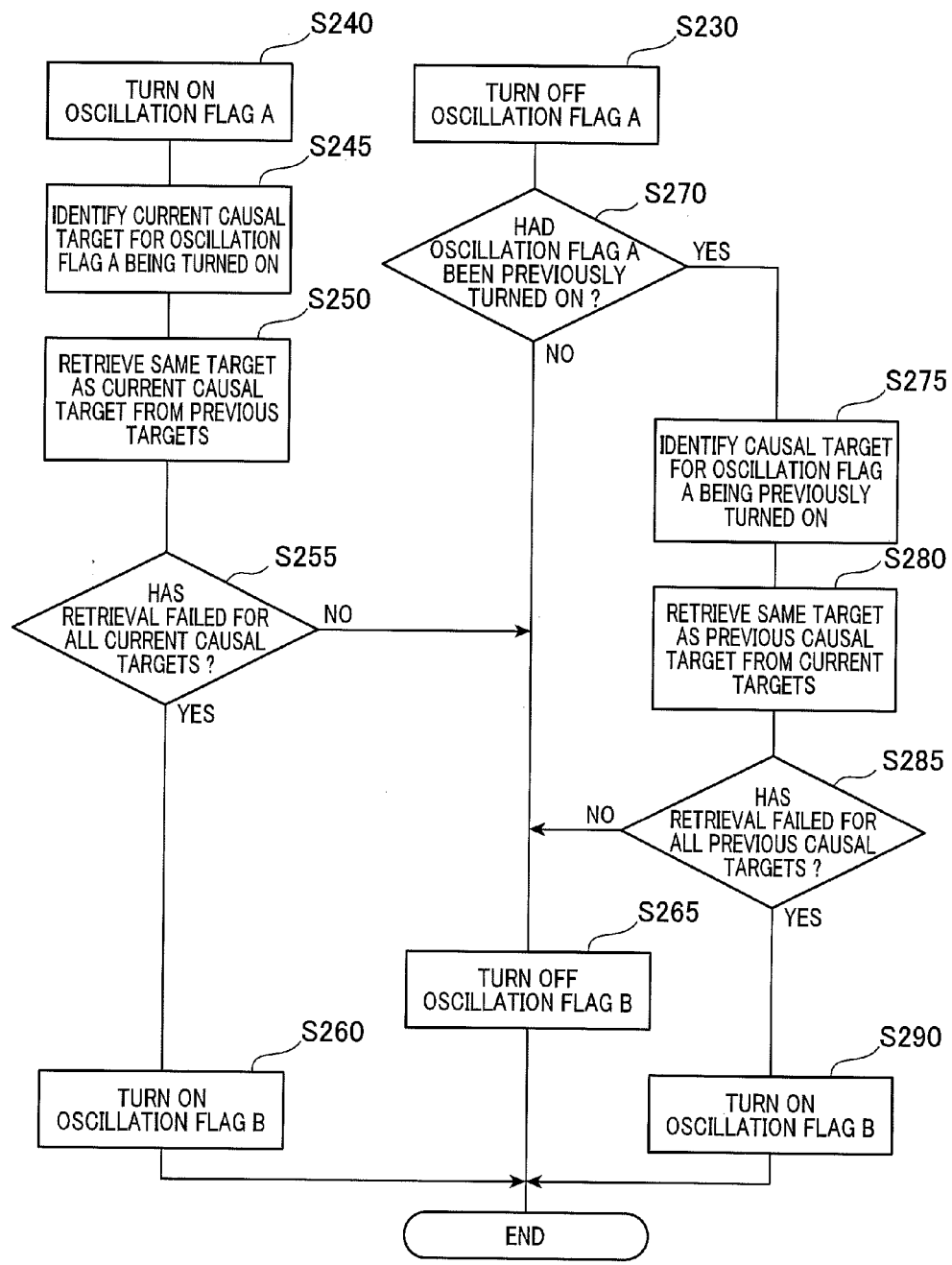
FIG. 6 is a flowchart of the details of a portion of an oscillation determination process for a power supply bias circuit performed by an FMCW radar device according to a third embodiment.

Specifically, the control unit 22 additionally performs the processing details as shown in FIG. 6 subsequent to steps S230 and S240 in the determination processes in FIG. 4 and FIG. 5, and sets an oscillation flag B ON and OFF. The processing details prior to steps S230 and S240 in the processes in FIG. 4 and FIG. 5 are the same as those according to the first and second embodiments, and are therefore omitted.

After turning ON the oscillation flag A at step S240, the control unit 22 proceeds to step S245 and identifies a target (referred to, hereinafter, as a current causal target) that has caused the oscillation flag A to be turned ON in oscillation determination at the current sampling timing.

Specifically, when the process in FIG. 4 is performed, the three or more targets determined to have the same relative speed at step S220 are each set as the current causal target. In addition, when the process in FIG. 5 is performed, the three targets determined to be aligned at an even interval at step S225 are each set as the current causal target.

At subsequent step S250, the control unit 250 retrieves a target that is the same as the current causal target from previous targets. Here, the previous targets are the targets that result from grouping at step S160 in the process in FIG. 2 at a previous sampling timing (in other words, the sampling timing immediately before the current sampling timing).

Whether or not a certain single current causal target is the same as a certain single previous target is determined based on the target data of the two targets. Specifically, the distance, relative speed, and direction of the single current causal target are respectively Da, Va, and Qa, and the distance, relative speed, and direction of the single previous target are respectively Db, Vb, and Qb. Then, only when Db+Vb·Δt−X1<Da<Db+Vb·Δt+X1, and Vb−X2<Va<Vb+X2, and Qb−X3<Qa<Qb+X3 are all established, the single current causal target and the single previous target are determined to be the same target. Δt indicates the time interval of sampling timings that are adjacent in terms of time. In addition, X1, X2, and X3 indicate allowable errors and are positive values.

When determined that a certain single current causal target is the same target as any one of the previous targets, retrieval of a target that is the same as the single current causal target is a success. In addition, when determined that a certain single current causal target is not the same target as any of the previous targets, retrieval of a target that is the same as the single current causal target is a failure.

At subsequent step S255, the control unit 22 determines whether or not retrieval has failed for all current causal targets. When determined that retrieval has failed for all current causal targets, the control unit 22 proceeds to step S260, turns ON the oscillation flag B, and completes oscillation determination. In addition, when determined that retrieval has been a success for at least one of the current causal targets, the control unit 22 proceeds to step S265, turns OFF the oscillation flag B, and completes oscillation determination.

At step S180 in FIG. 2 after completion of the process in FIG. 6, the control unit 22 determines that oscillation has occurred in the power supply bias circuit 10 when the oscillation flag B is turned ON, based on the oscillation determination result, and proceeds to step S190. The control unit 22 determines that oscillation has not occurred in the power supply bias circuit 10 when the oscillation flag B is turned OFF, and proceeds to step S185.

Failure of retrieval for all current causal targets indicates that the current causal targets are targets that have been detected for the first time at the current sampling timing. In other words, the current causal targets (three or more) are targets of which detection by the FMCW radar device 1 has been started at the same time.

As described earlier, when oscillation having a fixed cycle occurs in the power supply bias circuit 10, and as a result, noise is superimposed on any of the reception system, the BA system, and the PA system, the peak frequencies of signals P410 to P419 derived from noise that are included in the BB signal (beat signal) S4 synchronously track the frequency fluctuations of the normal signal P41. Therefore, detection of the signals P410 to P419 derived from noise should start at the same timing as the initial detection of the normal signal P41.

Therefore, as a result of the oscillation flag A being turned ON, the oscillation flag B being turned ON based on the detection of all current causal targets being started at the same time, and oscillation being determined to have occurred in the power supply bias circuit 10 in this way, a more highly accurate oscillation determination can be actualized.

In addition, after turning OFF the oscillation flag A at step S230, the control unit 22 proceeds to step S270 and determines whether or not the oscillation flag A had been turned ON at the previous sampling timing. When determined that the oscillation flag A had been turned ON, the control unit 22 proceeds to step S275. When determined that the oscillation flag A had not been turned ON (had been turned OFF), the control unit 22 proceeds to step S265, turns OFF the oscillation flag B, and completes oscillation determination.

At step S275, the control unit 22 identifies a target (referred to, hereinafter, as a previous causal target) that that had caused the oscillation flag A to be turned ON in oscillation determination at the previous sampling timing. Specifically, the control unit 22 records, in a memory, the targets identified as a result of step S245 being performed at the previous sampling timing (the current causal targets at the time of the previous sampling timing) together with the target data thereof, and sets all of the recorded targets as the previous causal targets at the current sampling timing.

At subsequent step S280, the control unit 22 retrieves a target that is the same as the previous causal target from the current targets. Here, the current targets are the targets that result from grouping at step S160 in the process in FIG. 2 at the current sampling timing.

Whether or not a certain single previous causal target is the same as a certain single current target is determined based on the target data of the two targets. Specifically, the distance, relative speed, and direction of the single previous causal target are respectively Dc, Vc, and Qc, and the distance, relative speed, and direction of the single current target are respectively Dd, Vd, and Qd. Then, only when Dd−Vd·Δt−X1<Dc<Dd−Vd·Δt+X1, and Vd−X2<Vc<Vd+X2, and Qd−X3<Qc<Qd+X3 are all established, the single previous causal target and the single current target are determined to be the same target.

When determined that a certain single previous causal target is the same target as any one of the current targets, retrieval of a target that is the same as the single previous causal target is a success. In addition, when determined that a certain single previous causal target is not the same target as any of the current targets, retrieval of a target that is the same as the single previous causal target is a failure.

At subsequent S285, the control unit 22 determines whether or not retrieval has failed for all previous causal targets. When determined that retrieval has failed for all previous causal targets, the control unit 22 proceeds to S290, turns ON the oscillation flag B, and completes oscillation determination. In addition, when determined that retrieval has been a success for at least one of the previous causal targets, the control unit 22 proceeds to step S265, turns OFF the oscillation flag B, and completes oscillation determination.

Failure of retrieval for all previous causal targets indicates that the previous causal targets are targets that are no longer detected at the current sampling timing. In other words, the previous causal targets (three or more) are targets of which detection by the FMCW radar device 1 has stopped at the same time.

As described earlier, when oscillation having a fixed cycle occurs in the power supply bias circuit 10, and as a result, noise is superimposed on any of the reception system, the BA system, and the PA system, the peak frequencies of signals P410 to P419 derived from noise that are included in the BB signal (beat signal) S4 synchronously track the frequency fluctuations of the normal signal P41. Therefore, detection of the signals P410 to P419 derived from noise should stop at the same timing as the initial stop of the detection of the normal signal P41.

Therefore, as a result of the oscillation flag A being turned OFF, the oscillation flag B being turned ON based on the detection of all current causal targets being stopped at the same time, and oscillation being determined to have occurred in the power supply bias circuit 10 in this way, a more highly accurate oscillation determination can be actualized.

According to each of the above-described embodiments, the control unit 22 functions as an example of an acquiring means by performing step S110, functions as an example of an orientation estimating means by performing steps S120 and S130, functions as an example of a pair matching means by performing step S140, functions as an example of a targeting means by performing step S150, functions as an example of a grouping means by performing step S160, functions as an example of an oscillating determining means by performing step S170, and functions as an example of a notifying means by performing steps S180 and S190.

Other Embodiments

The present invention is not limited to the above-described embodiments. Modifications can be made as appropriate within the scope recited in the scope of claims. In addition, the above-described embodiments are not unrelated to each other and can be combined as appropriate, excluding when combination is clearly not possible. In addition, it goes without saying that, in each of the above-described embodiments, elements configuring the embodiment are not necessarily requisites unless when particularly and explicitly described as being a requisite, when the element is clearly considered a requisite based on principle, and the like. In addition, in each of the above-described embodiments, where numerical values, such as quantity, value, amount, and range, of a constituent element of the embodiment are mentioned, the numerical values are not limited to the specified numbers unless when particularly and explicitly described as being a requisite, when the numerical value is clearly limited to the specified numbers based on principle, and the like. For example, the present invention also permits the following embodiments.

For example, according to the above-described first and second embodiments, when the oscillation flag A is turned ON at a certain single sampling timing, even when the oscillation flag A had not been turned ON at a previous sampling timing, oscillation is determined to have occurred in the power supply bias circuit 10 at step S180 in FIG. 2, and a signal indicating that oscillation has occurred is transmitted to the pre-crash control ECU.

In addition, according to the third embodiment, when the oscillation flag B is turned ON at a certain single sampling timing, even when the oscillation flag B had not been turned ON at a previous sampling timing, oscillation is determined to have occurred in the power supply bias circuit 10 at step S180 in FIG. 2, and a signal indicating that oscillation has occurred is transmitted to the pre-crash control ECU.

However, the present invention is not necessarily required to be configured in this way. For example, oscillation may not be determined to have occurred in the power supply bias circuit 10 at step S180 in FIG. 2 until the sampling timings at which the oscillation flag (the oscillation flag A for the first and second embodiments and the oscillation flag B for the third embodiment) is turned ON reach a predetermined plurality of number of times or more. Oscillation may be determined for the first time to have occurred in the power supply bias circuit 10 when the sampling timings at which the oscillation flag is turned ON reach the predetermined number of times or more. A signal indicating that oscillation has occurred may then be transmitted to the pre-crash control ECU. As a result of this configuration, a more highly accurate oscillation determination can be actualized.

REFERENCE SIGNS LIST

1: FMCW radar device
10: power supply bias circuit
11: DAC
12: VCO
13: BA
14: distributor
15: PA
16: transmission antenna
17: local amplifier
18a to 18x: reception antenna
19a to 19x: mixer
22: control unit

What is claimed is:

1. An FMCW radar device comprising:
a transmission unit that transmits a transmission signal that has a rising portion in which the frequency successively increases and a falling portion in which the frequency successively decreases;
a reception unit that receives a reception signal resulting from the transmission signal being reflected by a target and outputs a beat signal based on the transmission signal and the reception signal; and
a control unit that determines whether or not three or more targets that have the same relative speed are present at the same orientation among a plurality of targets extracted from a plurality of peak frequencies in each of the rising portion and the falling portion of the beat signal, and when determined that three or more targets are present, gives notification that oscillation has occurred in a power supply bias circuit that supplies power supply voltage to the transmission unit or the reception unit.

2. The FMCW radar device according to claim 1, wherein:
the control unit includes:
acquiring means for acquiring the beat signal outputted from the reception unit;
orientation estimating means for identifying a plurality of peak frequencies in each of the rising portion and the falling portion of the beat signal acquired by the acquiring means, and estimating a reception orientation for each of the identified plurality of peak frequencies;
pair matching means for extracting a plurality of pairs of peak frequencies corresponding to the same target, between the plurality of peak frequencies in the rising portion and the plurality of peak frequencies in the falling portion;

targeting means for calculating the distance to the target corresponding to the pair and the relative speed of the target, and generating target data for each of the extracted plurality of pairs;

grouping means for grouping each pair group that corresponds to the same object among the plurality of pairs and setting the pair group as a single target;

oscillating determining means for determining whether or not the plurality of targets acquired by the grouping means meet a predetermined oscillation condition; and a notifying means for giving notification that oscillation has occurred in the power supply bias circuit that supplies a power supply voltage to the transmission unit or the reception unit, when the oscillation determining means determines that the plurality of targets meet the predetermined oscillation condition; and the predetermined oscillation condition is a condition that three or more targets having the same relative speed are present at the same orientation, among the plurality of targets acquired by the grouping means.

3. The FMCW radar device according to claim 2, wherein:
the predetermined oscillation condition is a condition that three or more targets having the same relative speed are present at the same orientation, among the plurality of groups acquired by the grouping means, and when three target among the three or more targets are A, B, C in order from the shortest distance to the three targets, a relationship B–A=C–B is established.

4. The FMCW radar device according to claim 3, wherein:
the control unit repeatedly and sequentially operates the acquiring means, the orientation estimating means, the pair matching means, the targeting means, the grouping means, and the oscillation determining means; and
the predetermined oscillation condition is a condition that detection of the three or more targets determined to have the same relative speed and be at the same orientation, among the plurality of targets acquired by the grouping means, is started at the same time.

5. The FMCW radar device according to claim 4, wherein:
the control unit repeatedly and sequentially operates the acquiring means, the orientation estimating means, the pair matching means, the targeting means, the grouping means, and the oscillation determining means; and
the predetermined oscillation condition is a condition that detection of the three or more targets determined to have the same relative speed and be at the same orientation, among the plurality of targets acquired by the grouping means, is stopped at the same time.

6. The FMCW radar device according to claim 5, wherein:
the control unit repeatedly and sequentially operates the acquiring means, the orientation estimating means, the pair matching means, the targeting means, the grouping means, and the oscillation determining means; and
the notifying means gives notification that oscillation has occurred in the power supply bias circuit that supplies a power supply voltage to the transmission unit or the reception unit, when the oscillation determining means determines that the plurality of targets meet the predetermined oscillation condition a predetermined number of times.

7. The FMCW radar device according to claim 2, wherein:
the control unit repeatedly and sequentially operates the acquiring means, the orientation estimating means, the pair matching means, the targeting means, the grouping means, and the oscillation determining means; and the predetermined oscillation condition is a condition that detection of the three or more targets determined to have the same relative speed and be at the same orientation, among the plurality of targets acquired by the grouping means, is started at the same time.

8. The FMCW radar device according to claim 2, wherein:
the control unit repeatedly and sequentially operates the acquiring means, the orientation estimating means, the pair matching means, the targeting means, the grouping means, and the oscillation determining means; and
the predetermined oscillation condition is a condition that detection of the three or more targets determined to have the same relative speed and be at the same orientation, among the plurality of targets acquired by the grouping means, is stopped at the same time.

9. The FMCW radar device according to claim 2, wherein:
the control unit repeatedly and sequentially operates the acquiring means, the orientation estimating means, the pair matching means, the targeting means, the grouping means, and the oscillation determining means; and
the notifying means gives notification that oscillation has occurred in the power supply bias circuit that supplies a power supply voltage to the transmission unit or the reception unit, when the oscillation determining means determines that the plurality of targets meet the predetermined oscillation condition a predetermined number of times.

10. A noise detection method of an FMCW radar device, wherein:
a transmission unit transmits a transmission signal that has a rising portion in which the frequency successively increases and a falling portion in which the frequency successively decreases;
a reception unit receives a reception signal resulting from the transmission signal being reflected by a target and outputs a beat signal based on the transmission signal and the reception signal; and
a control unit determines whether or not three or more targets that have the same relative speed are present at the same orientation among a plurality of targets extracted from a plurality of peak frequencies in each of the rising portion and the falling portion of the beat signal, and when determined that three or more targets are present, gives notification that oscillation has occurred in a power supply bias circuit that supplies power supply voltage to the transmission unit or the reception unit.

11. The noise detecting method of an FMCW radar device according to claim 10, wherein:
the control unit
acquires the beat signal outputted from the reception unit,
identifies a plurality of peak frequencies in each of the rising portion and the falling portion of the acquired beat signal, and estimates a reception orientation for each of the identified plurality of peak frequencies,
extractes a plurality of pairs of peak frequencies corresponding to the same target, between the plurality of peak frequencies in the rising portion and the plurality of peak frequencies in the falling portion,
calculates the distance to the target corresponding to the pair and the relative speed of the target, and generates target data for each of the extracted plurality of pairs,
groups each pair group that corresponds to the same object among the plurality of pairs and sets the pair group as a single target, determines whether or not the acquired plurality of targets meet a predetermined oscillation condition that three or more targets having the same relative speed are present at the same orientation, and gives notification that oscillation has occurred in the power supply bias circuit that supplies a power supply voltage to the transmission unit or the reception unit, when the plurality of targets are determined to meet the predetermined oscillation condition.

* * * * *